United States Patent [19]

Barré

[11] 4,231,779
[45] Nov. 4, 1980

[54] APPARATUS FOR MOLDING GLASS OBJECTS WITH TONGS AND SPADES

[76] Inventor: René E. L. Barré, 39 boulevard Bourdon, Paris, France

[21] Appl. No.: 13,361

[22] Filed: Feb. 21, 1979

[30] Foreign Application Priority Data

Nov. 10, 1978 [FR] France ............................. 78 31899

[51] Int. Cl.³ .......................................... C03B 11/00
[52] U.S. Cl. ...................................... 65/323; 65/226; 65/360
[58] Field of Search ................. 65/78, 77, 76, 82, 226, 65/227, 323, 360, 66

[56] References Cited

U.S. PATENT DOCUMENTS

364,211  6/1887  Brooke .................................. 65/227
793,280  6/1905  Curran .................................. 65/323

Primary Examiner—Richard V. Fisher
Attorney, Agent, or Firm—Jones, Thomas & Askew

[57] ABSTRACT

Apparatus for manufacturing glass objects includes a pressing operation after a rough shaping operation in a blank mold comprising two separable chill-mold halves and tongs forming the base of the mold. Two spades move toward and away from the mold position without movement of the tongs.

3 Claims, 1 Drawing Figure

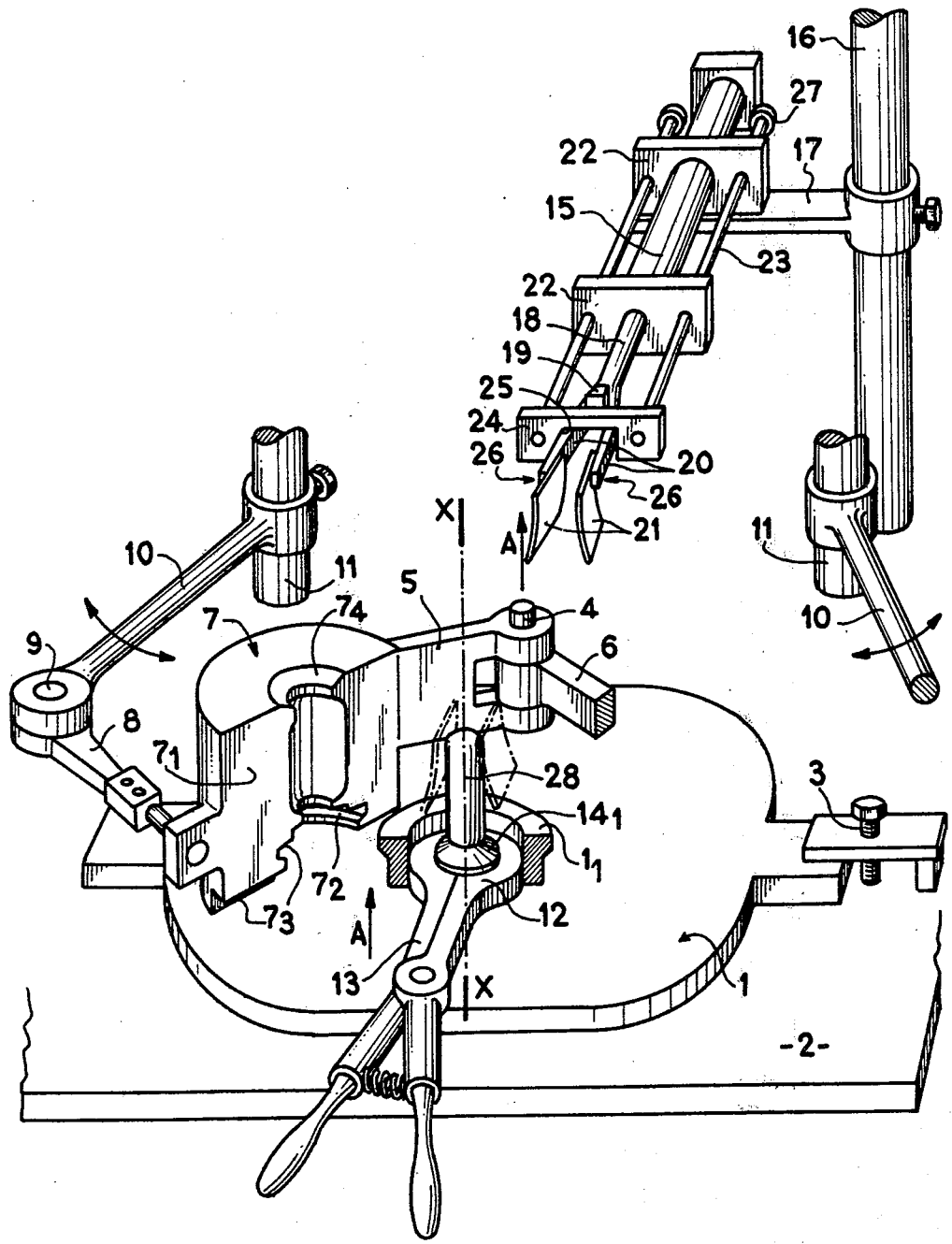

APPARATUS FOR MOLDING GLASS OBJECTS WITH TONGS AND SPADES

The invention relates to an apparatus for manufacturing glass objects, such as particularly bottles.

For the manufacture of glass objects, for example small dimensioned bottles such as are used in the perfume industry, the first step is to place an accurate quantity or gob of molten glass in a blank or rough-shaping mould by transferring this glass with the aid of a blowpipe from inside a furnace.

This blank mould is composed of two chill-mould halves movable symmetrically relative to their joining plane, and of tongs constituting the base of this mould, and which, in the case of bottles, forms the external surface of the neck of the bottle. After opening this blank mould, a worker grips with one hand the tongs supporting the parison by the neck of the bottle to be made, and then carries out a pressing operation with the help of tongs which he holds in his other hand, then he transfers the tongs of the blank mould, still supporting the parison, towards a finishing mould, where the blowing and suction operations giving the bottle its final form are carried out.

The intermediate pressing operation is extremely delicate, and up till now has required a specialised and highly-skilled worker used to this special work. The purpose of this pressing operation is to flatten, stretch and press the blank at determined points, and at determined times, as a function of the shape adopted by this soft glass parison, thus suspended in the tongs, and also as a function of the temperature adopted by the parison, whose glass continues to cool.

Thus, the worker carrying out this pressing modifies the shape and the thermal state of the glass by manipulating the tongs supporting the parison and acting upon this parison, with the aid of the pressing tongs, increasing the development of the temperature locally adopted by the glass of the parison and likewise increase the development of the shape of said parison.

However, this delicate pressing operation, which requires a relatively long time (a few seconds), despite the skill of the worker, involves a non-uniform distribution of the temperature and thus of the softened state of the glass, as a function of the parison's shape and the volume of molten glass, which is transferred into the finishing mould, and despite any pre-heating which may have been carried out, by a non-uniform flow of the molten glass resulting in faults in the glass and irregular glass wall thickness.

A particular purpose of the present invention is to remedy these drawbacks, and to this end relates to a method of manufacturing glass objects comprising a pressing operation after a rough shaping operation in a blank mould comprising two movable chill-mould halves and tongs forming the base of this mould, said method being characterised in that the pressing operation is effected at the location of the blank mould but after separation of the two chill-mould halves, without movement of the tongs supporting the parison.

The invention likewise relates to apparatus for carrying out the above named method, characterised in that the apparatus comprises two spades movable in the direction of the blank mould, moving symmetrically to the joining plane of the two chill-mould halves, these two spades moving towards one another in the direction of the axis of the blank mould determined by the axis of the tongs which are kept stationary during the rough shaping and pressing operations.

According to one feature of the invention, the two movable spades are articulated at the end of the piston rod of a ram, and co-operate with symmetrical cam surfaces for bringing them closer towards the axis of the tongs.

The invention is represented by way of non-limiting example in the single annexed FIGURE, which is a schematic perspective view of the apparatus illustrating the invention.

Consequently the present invention has as its purpose to effect a pressing operation which, compared to the known procedure, is more rapid and is carried out on a parison at a high temperature, without this pressing involving imbalance of the parison on the tongs, and pressing then allowing introduction into the finishing mould of the parison with an accurately formed shaped and with a high and well distributed temperature, in order finally to obtain a good quality bottle whose quality is maintained from one bottle to the next, i.e. with a low percentage of rejects.

The accompanying FIGURE shows a blank mould composed of a platform 1, fixed to a table 2 by means 3 immobilising the platform relative to the table, the platform being provided with a spindle 4 pivotally receiving the arms 5 and 6, each of which supports a chill-mould half 7 of the blank mould.

Only one of these chill-mould halves is shown in the accompanying drawing. These chill-mould halves 7 each have a joining surface $7_1$ which are applied one against the other in the joining plane A—A of the blank mould, when the arms 5 and 6 are pivoted around spindle 4.

Pivoting of these arms 5 and 6 and of chill-mould halves 7 is effected by an arm 8 connected by an articulation 9 to an arm 10 fast with a spindle 11 which is turned about its axis.

In the joining plane A—A and on the platform 1 there is also fixed a part $1_1$ whose external face corresponds to that of recesses $7_2$ provided on the chill-mould halves 7 in order to complete the mould, and whose internal face is designed to support and centre in the axis of the blank mould, the jaws 12 of the blank mould tongs 13.

These tongs 13 and their jaws 12 have an external form which is complementary to that of recesses $7_3$ of the chill-mould halves 7, in order to form the base of the mould, jaws 12 otherwise having a central opening whose shape and dimensions correspond to those of the neck of the bottle to be made.

In the joining plane A—A of the chill-mould halves 7, which likewise contains the axis X—X of the ring formed by the jaws 12 when closed together and thus of the blank mould, there is located the axis of a ram whose cylinder 15 is rigidly fixed to the platform 1 by means of a post 16 and an arm 17.

The piston rod 18 of this ram carries two arms 20 each supporting a spade 21, these arms 20 and spades 21 being symmetrical relative to the plane of join A—A.

Also mounted in a sliding manner on cheek plates 22 defining the extremities of cylinder 15 are rods 23 supporting at one of their ends a yoke 24 carrying a wedge 19 between the arms 20, the internal edge 25 of which yoke co-operates with the external edge 26 of cam shape, arms 20 supporting the spades 21. These arms 20 are kept applied by their cam-shaped edges 26 against the edges 25, by means of a spring not shown.

Moreover, the rods 23 are provided with stops, such as 27, intended to limit their sliding movement.

The method of operation of this machine for producing a pressed parison of a glass bottle is as follows:

The blank mould being closed, i.e. tongs 13 having been put in place on part $1_1$, and the chill-mould halves 7 being closed around part 1, and tongs 13 being in the plane of join A—A, a gob of molten glass is deposited in the mould through the flared upper orifice $7_4$ of the chill-mould halves. The glass flows into the mould, filling it, whereupon the worker operates a pedal which controls the spindles 11, in order to pivot the chill-mould halves 7 around the spindle 4.

The parison 28 is then kept vertically in the joining plane A—A, and in the inverted position, by the tongs 13, the jaws of which are held closed and stationary in the part $1_1$.

As soon as the mould is opened by separation of chill-mould halves 7 the ram 15 is pressurised so that its piston rod 18 shifts in the joining plane A—A in the direction of the parison 28. During this movement, the arms 20 likewise carry the yoke 24 and thus the rods 23 which slide in the cheek plates 22. When the spades 21 reach the parison 28, the stops 27 come up against the rear cheek plate 22, moving the yoke 24, while piston rod 18 continues its advance movement towards the parison 28. There is therefore a movement of arms 20, relative to the yoke 24, in such a manner that the internal edge 25 of yoke 24 acts on the cam-shaped edges 26 of arms 20, to bring spades 21 closer to one another and against the parison 28. When the spades 21 have flattened and squeezed the parison at determined places and for a determined period, the cylinder 15 is depressurised in order to withdraw piston rod 18, which is initially effected without passing beyond the yoke 24, so that the arms 20 move spades 21 apart, at the beginning of their withdrawal movement.

It is noted that this pressing operation is effected from the moment of separation of chill-mould halves 7, i.e. when the parison is at the highest possible temperature, while this parison, kept stationary in its formation position, is in vertical balance on the tongs 13. Distortion of the parison between opening of the mould and pressing is thus reduced to a minimum, and the spades 21, which are cold, have the sole purpose of keeping the parison pressed and of cooling it locally, with a view to its introduction into the finishing mould.

Moreover, in view of the fact that this pressing operation is effected from the moment of opening of the blank mould, the transfer time of the pressed parison to the finishing mould constitutes a longer period of time during which the temperature of the parison may be homogenised but without the temperature of said parison upon its introduction into the finishing mould being too low.

I claim:

1. In apparatus for manufacturing glass objects comprising a pair of chill-mould halves each including a mould recess, means for moving said mould halves toward and away from each other whereby the mould halves are movable together with their mould recesses in registration with each other to form a mould cavity with an upright axis at a predetermined mould position, tongs including jaws sized and shaped to fit into the mould cavity and to form the lower portion of the mould cavity, whereby a gob of molten glass is placed in the mould cavity and the mould halves are moved away from each other to leave a parison supported by the jaws of said tongs at the mould position, the improvement therein of two spades movable toward and away from said mould position on opposite sides of the upright axis, and means for moving said spades first in position on opposite sides of the parison supported by said jaws and then into contact with the parision, then out of contact with the parison and finally away from positions on opposite sides of the parison.

2. In the apparatus of claim 1, said means for moving said spades comprising fluid actuated cylinder means for moving said spades toward and away from positions on opposite sides of the parison, and cam means responsive to the movement of the spades toward and away from positions on opposite sides of the parison for moving the spades toward and away from contact with the parison.

3. In the apparatus of claim 1 wherein said mould halves join each other substantially in a plane, the futher improvement therein of said spades being constructed and arranged to move parallel to the joining plane of the mould halves as the spades move toward or away from their positions on opposite sides of the parison at the mould position.

* * * * *